(12) United States Patent
Filo et al.

(10) Patent No.: US 7,457,531 B2
(45) Date of Patent: Nov. 25, 2008

(54) LOW BANDWIDTH IMAGE SYSTEM

(75) Inventors: Andrew S. Filo, Cupertino, CA (US); David G. Capper, Novato, CA (US)

(73) Assignee: Hasbro, Inc., Pawtucket, RI (US)

( * ) Notice: Subject to any disclaimer, the term of this patent is extended or adjusted under 35 U.S.C. 154(b) by 960 days.

(21) Appl. No.: 10/623,340

(22) Filed: Jul. 18, 2003

(65) Prior Publication Data

US 2004/0076407 A1 Apr. 22, 2004

Related U.S. Application Data

(60) Provisional application No. 60/418,874, filed on Oct. 16, 2002.

(51) Int. Cl.
*H04N 5/00* (2006.01)
(52) U.S. Cl. .................. 386/125; 386/128; 386/118
(58) Field of Classification Search .............. 386/96, 386/97, 98, 99, 104–105
See application file for complete search history.

(56) References Cited

U.S. PATENT DOCUMENTS

| | | | |
|---|---|---|---|
| 3,855,426 A | | 12/1974 | Bouwhuis |
| 3,962,721 A | | 6/1976 | de Haan |
| 4,018,987 A | | 4/1977 | Keizer |
| 4,227,213 A | | 10/1980 | Isobe |
| 4,322,759 A | | 3/1982 | Zenzefilis |
| 4,523,304 A | | 6/1985 | Satoh et al. |
| 4,527,264 A | | 7/1985 | d'Alayer de Costemore d'Arc |
| 4,896,309 A | * | 1/1990 | Yamakawa et al. ......... 369/47.3 |
| 5,214,514 A | | 5/1993 | Haberkern |
| 5,408,331 A | | 4/1995 | Ota |
| 5,448,372 A | | 9/1995 | Axman et al. |
| 5,526,134 A | | 6/1996 | Furuki et al. |
| 5,887,108 A | | 3/1999 | Park |
| 5,893,062 A | * | 4/1999 | Bhadkamkar et al. ........ 704/270 |
| 5,914,706 A | | 6/1999 | Kono |
| 5,914,707 A | | 6/1999 | Kono |
| 5,956,310 A | | 9/1999 | d'Alayer de Costemore d'Arc |
| 6,018,613 A | | 1/2000 | Ota et al. |
| 6,112,226 A | * | 8/2000 | Weaver et al. ............... 709/203 |
| 6,169,847 B1 | | 1/2001 | Mizoguchi et al. |
| 6,334,026 B1 | * | 12/2001 | Xue et al. ..................... 386/98 |

(Continued)

*Primary Examiner*—Thai Tran
*Assistant Examiner*—Tat Chi Chio
(74) *Attorney, Agent, or Firm*—Perry Hoffman

(57) ABSTRACT

The audio and video information is formatted for right and left stereo tracks of the CD-DA with the bit map video information being stored on one audio channel and the PCM audio being stored on the other stereo channel. The two channels are interleaved and recorded to the CD-DA in a manner similar to CD-DAs that have only audio information recorded thereon. In the preferred embodiment, a CD-DA disc of generally smaller diameter is utilized with the portable reproducing device such that a device of smaller size is realized. The portable reproducing device includes a housing with a display, one or more outputs for communicating audio information to an external device, such as a speaker, a pivoting cover providing access to a loaded CD-DA, and means control the operation of the portable reproducing device. In operation, the portable reproducing device is operable to read the time-synchronized interleaved audio and video information recorded on the CD-DA, and process a signal representative thereof in an information processor. The processor extracts the audio and video information from the interleaved stereo audio channels and provides an audio signal and video signal to respective audio and video interfaces for reproduction by a speaker and a display.

33 Claims, 14 Drawing Sheets

U.S. PATENT DOCUMENTS

| | | | |
|---|---|---|---|
| 6,374,040 B2 * | 4/2002 | Mizoguchi et al. | 386/125 |
| 6,445,878 B1 | 9/2002 | Kato et al. | |
| 7,027,717 B1 * | 4/2006 | Tsujii et al. | 386/96 |
| 2001/0004310 A1 | 6/2001 | Kono | |
| 2001/0016114 A1 | 8/2001 | Van Gestel et al. | |
| 2002/0024893 A1 * | 2/2002 | Hashimoto | 369/30.32 |
| 2002/0131759 A1 | 9/2002 | Lakhansingh | |
| 2002/0136540 A1 | 9/2002 | Adams et al. | |

* cited by examiner

LOW BANDWIDTH IMAGE SYSTEM

CLAIM FOR PRIORITY

The present application claims priority to co-pending provisional patent application No. 60/418,874, filed on Oct. 16, 2002.

BACKGROUND OF THE INVENTION

1. Field of the Invention

The present invention relates to sound and image producing systems. More particularly, the invention relates to systems and methods including audio compact discs ("CDs") and the like for storing image and audio process and control data, and interfaces with players that receive, process, and reproduce sounds and/or images.

2. Description of the Related Art

Sound and/or image-producing devices such as cassette players, compact disc players, and portable video devices, etc. are popular entertainment devices. They make use of cassette tapes, compact discs, memory, or game cards that store information such as music and game commands. The cassette, compact disc, or hand-held video game players receive information stored on tape, disc, or card and process such information to produce sound and/or visual images.

Types of CDs exist for recording and reproducing applications including those where one or more types of data are recorded for reproduction. Some commercially available CD types include a compact disc digital audio ("CD-DA"), a compact disc read only memory ("CD-ROM"), compact disc interactive ("CD-I"), and a video CD or a digital versatile disk ("DVD"). The CD-DA is known for use as a storage medium for audio that is converted into digital code by sampling the sound waves at 44.1 kHz and converting each sample into a 16-bit number. In addition, a blank or recordable compact disk may be referred to as a "CD-R." In some applications a CD-ROM format is used to store text, graphics, and audio information. The CD-ROM storage format is different from that of a CD-DA and a CD-DA player cannot play CD-ROMs. In applications where full-motion is recorded, a video CD format may be used for recording VHS-quality video and CD-quality audio. Video CD movies are compressed using the MPEG-1 method and require a motion picture experts group ("MPEG") decoder for playback. The CD-I format is used to store data, audio, still video, or animated graphics. CD-Is include an operating system standard and methods for compressing the data such that video images may be displayed. A CD-I requires a CD-I player for reproduction of stored information and cannot be played on, for example, a CD-DA player.

With the above-noted compact disc technology in existence, systems have been developed for recording and reproducing audio and video information. One video signal recording system described in U.S. Pat. No. 4,227,213 to Isobe for a "Video Signal Recording System" issued on Oct. 7, 1980, relates to recording a stationary image signal and an audio signal on a common video disc. In this system, video frames representing stationary images are recorded such that frame, or image, starting points are located on a common radial line of the video disc. The audio signal associated with the stationary image is time compressed and recorded in equal sized portions at predetermined intervals, and in-between portions of the video frame. In this manner, a frame for a stationary image and the audio signal associated therewith, is recorded in approximately two video frames worth of video disc space. The reproduction of the audio and video data is respectively provided by audio expansion and video delay circuitry.

In other systems, a CD-I may be used as a medium for recording video, text, program, and audio information. These systems typically include a reproducing device that operates interactively with the user for playing back the stored information. However, these systems are often uneconomical for use as entertainment devices for children due to excessive hardware costs for accessing and processing the interactive program data and compressed video information on the CD-I. In addition, CD-I discs will not play in a CD-DA player.

One system described in U.S. Pat. No. 6,445,878 to Kato et al. for a "Disc Recorded With Audio, Image, And Operation Image Data From Which Sound And Images Can Be Reproduced And Apparatus For Reproducing Sound And Images From Such Disc" issued on Sep. 3, 2002, relates to a CD-I disc having recorded sound and image information along with program and operation image data. The disclosed reproducing apparatus reproduces information stored on a CD-I, a CD-I/CD-DA, and a CD-DA. The CD-I/CD-DA disc includes CD-I tracks mixed with CD-DA tracks. The data format used for recording the sound and image information along with program and operation image data includes mixed "form 1" and "form 2" data structures corresponding to "mode 1" and "mode 2" formats of a CD-ROM. The "form 1" and "form 2" formats for the CD-I also employ video compression and a sub-header having blocks on which recorded sound, picture, and data are time-division-multiplexed. The sub-header is composed of the file number, channel number, sub-mode, and data type. The audio information is written in the CD-I as either 16-bit pulse code modulated ("PCM") data sampled at 44.1 kHz, 8-bit or 4-bit adaptive differential pulse code modulation ("ADPCM") sampled at 37.8 kHz, or 4-bit ADPCM sampled at 18.9 kHz. The video data is compressed from 8-bit data to 4-bit data for recording and then expanded back to 8-bit data during reproduction. A central processing unit ("CPU") controls the CD-I system and, along with components including a system controller, master controller, and CD-ROM producing circuit, audio, video, and operation image data is processed and presented to the user according to program data stored on the CD-I or CD-I-CD-DA. Further, a CD-RTOS (real time operating system) handles files stored in a read only memory ("ROM") provided as part of the system.

Another system disclosed in U.S. Pat. No. 5,408,331 to Ota for an "Optical Disc Reproducing Apparatus Having Selectable Processing Speeds" issued on Apr. 18, 1995, relates to an optical disc reproducing apparatus for CD-Is on which information such video information, computer data, application programs are recorded in addition to audio information. The apparatus includes voice signal processing for decoding ADPCM audio data and picture signal processing with tow channels of video signal processing circuits for picture superposition and switching. A controller includes a microcomputer ("MCPU"), a master controller for decoding addresses from the MCPU and controlling direct memory accessing ("DMA"), and a CD-RTOS stored in ROM. In addition, the system includes a small computer system interface (SCSI) for exchanging data or commands with, for example, a host computer via data input/output terminal, a crystal oscillator for supplying a clock signal to the MCPU. A frequency divider divides the clock signal from the crystal oscillator and a changeover switch selects one of multiple clock signals with different frequencies and supplies the selected clock signal to the MCPU, which allows a user to varying the program execution speed.

Other systems are known, including those disclosed in U.S. Pat. Nos. 5,914,706 to Kono for a "Compact Portable Audio- Display Electronic Apparatus With Interactive Inquirable And Inquisitorial Interfacing" issued on Jun. 22, 1999, and 5,914,707 to Kono for a "Compact Portable Audio/Display Electronic Apparatus With Interactive Inquirable And Inquisitorial Interfacing" issued on Jun. 22, 1999. These above-noted patents disclose an apparatus where audio and video information is recorded for reproduction on a portable device. However, these systems are employed to provide interfacing with video data stored as CD-I or CD-ROM formatted data and not with video data formatted for storage on CD-DA. In addition, DVDs and players, such as those described in U.S. Pat. Nos. 6,169,847 and 6,347,040 both to Mizoguchi et al. for a "Portable DVD Player" respectively issued on Jan. 2, 2001 and Apr. 16, 2002. The noted patents disclose a DVD players employed for high capacity media recording and reproduction using multi-layer disc and MPEG compression technology. MPEG compression is a lossy compression method in which some of the original image is lost. MPEG uses intraframe coding for individual frames, but also used interframe coding, which further compresses the video data by encoding only the differences between periodic key frames (known as I-frames). The disclosed players include a displaying and outputting mechanism mixing and displaying the main image decoded by an MPEG decoder and a sub image decoded by a sub-picture decoder. A voice outputting mechanism outputs voice regenerated by an audio decoder. Moreover, the players include a communications interface, PC card interface, and a universal serial bus ("USB") interface to encrypt data for output. Although such players may be used to reproduce audio and video information, the multi-layer disc recording and processing technology employed in DVD applications is different from that used in CD-DA recorders and players.

While the above-noted systems and apparatus are known, they are insufficient for use as economical and simple entertainment devices capable of sound and image reproduction. Compact discs having the same mechanical size as an ordinary compact disc for music (CD-DA) are disclosed for reproducing PCM audio from a CD-DA information, but only for music entertainment and not for video reproduction. Moreover, known systems do not record and reproduce interleaved bit map video and PCM audio information onto or from a CD-DA. Accordingly, there exists a need for a simple and efficient system that records audio and bit-map video information on a CD-DA and reproduces the information using a portable reproducing device.

SUMMARY OF THE INVENTION

In one embodiment, the invention provides a portable device for reproducing information stored on a compact disc including a housing for receiving the compact disc, a light emitting diode data acquisition sub-assembly for reading information from the compact disc, and an information processor. The information processor is coupled to a video interface, an audio interface, and the light emitting diode data acquisition sub-assembly, and a display unit is in communication with the video interface for displaying video information provided from the information processor. The compact disc is preferably of the compact disc digital audio, or CD-DA, type and generally smaller in diameter than conventional CD-DAs. In at least one embodiment, the CD-DA is approximately three inches in diameter. The smaller disc size allows the portable device to be generally small in dimension thus, in some embodiments, providing a portable device suitable for children.

In some embodiments, a signal amplifier may provide a time-synchronized modulated signal from the data acquisition sub-assembly providing an audio signal and a video signal derived into a first channel and a second channel from the compact disc. The video signal may be formatted to include frame markers to allow for video reproduction from the modulated signal. The modulated signal may include interleaved video and audio information and is processed by the information processor into respective audio and video signals. The audio interface includes an amplifier and an audio output that may be coupled to a speaker in the housing. The display unit may be provided as a liquid crystal display ("LCD") in the housing and operable to display bit map information. Moreover, preferred embodiments provide a light emitting diode data acquisition sub-assembly that rotates the compact disc clockwise.

According to another embodiment, the invention provides a method of formatting audio and video information on a compact disc and reproducing the audio and video information using a portable device having an information processor coupled to an audio interface, a video interface, and a light emitting diode data acquisition sub-assembly. The method may include combining a number of video pixels per sample to generate a reduced sample-per-frame number, and allocating a portion of available samples, based on a sampled audio throughput and the reduced sample-per-frame number, as a frame start and end portion. In addition, the method may include formatting the frame portions and recording the video and audio information on respective first and second channels as a modulated signal. Reproduction by the portable device may include acquiring the video and audio information by the light emitting diode data acquisition sub-assembly, processing the video and audio information in the information processor, and reproducing the time-synchronized video and audio information. In preferred embodiments, the first and second channels are respective left and right audio channels associated with the compact disc, and the video and audio information is time-synchronized and interleaved.

According to yet another embodiment, the invention provides a system for reproducing audio and video information that includes a recorder for associating video and audio information with respective first and second channels that are interleaved and recorded onto a compact disc, and a portable device for reproducing data stored on the compact disc. In some embodiments, the portable device includes a housing for receiving the compact disc and includes a main body, top and bottom covers, a display portion, and a media cover portion. The media cover portion may be connected to the main body and pivot between open and closed positions, and about an axis that is parallel to the axis of compact disc rotation.

Briefly summarized, the invention relates to formatting and storing audio and video information in a CD-DA format and reproducing the information on a compact portable device having interfaces for audio and video. The audio and video information is formatted for right and left stereo tracks of the CD-DA with the bit map video information being stored on one audio channel and the PCM audio being stored on the other stereo channel. The two channels are interleaved and recorded to the CD-DA in a manner similar to CD-DAs that have only audio information recorded thereon. In the preferred embodiment, a CD-DA disc of generally smaller diameter is utilized with the portable reproducing device such that a device of smaller size is realized. The portable reproducing device includes a housing with a display, one or more outputs for communicating audio information to an external device, such as a speaker, a pivoting cover providing access to a loaded CD-DA, and means control the operation of the portable reproducing device. In operation, the portable reproducing device is operable to read the time-synchronized interleaved audio and video information recorded on the CD-DA, and process a signal representative thereof in an information processor. The processor extracts the audio and video information from the interleaved stereo audio channels and provides an audio signal and video signal to respective audio and video interfaces for reproduction by a speaker and a display. The user may operate the portable device by pivoting open the media cover portion, inserting a CD-DA formatted as described above, closing the media cover portion, and initiating one or more of the control means on the device. The invention may be implemented with less costly components and electronics, and provides an alternative to CD-I or CD-I/CD-DA formatted discs and reproducing devices where sector-interleaving is employed along with sub-headers for multiple data types. The above-noted features of the invention provide a storage format and portable reproducing device that form a novel system for image and audio information reproduction that is compact, simple, and economical for use by children.

Additional objects and advantages of the invention will be set forth below with reference to the drawings and the detailed description. It is to be understood that the invention is not limited in its application to the details of the examples provided in the description or illustrated in the drawings. The invention is capable of other embodiments and of being practiced or carried out for a variety of applications and in various ways.

DETAILED DESCRIPTION OF THE PREFERRED EMBODIMENT

Figure 1:
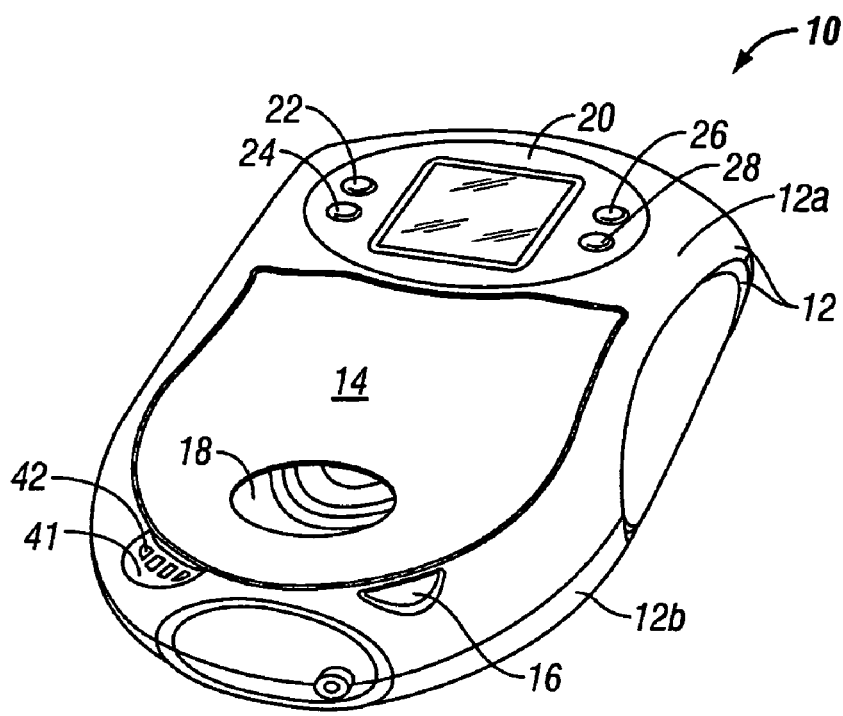
FIG. 1 illustrates an exemplary perspective view of the front of a portable device.

One embodiment of the invention is illustrated in FIG. 1 including a portable device 10. The device 10 may be constructed out of various known materials and includes a housing 12 of generally low profile with an upper portion 12a and a lower portion 12b. The perimeter of the upper portion 12a and lower portion 12b may extend or curve in a direction such that engagement of the upper and lower portions yields a cavity therebetween. In addition, the upper portion 12a and lower portion 12b may be contoured for comfort and to remove sharp corners. A lid 14 is coupled to the upper portion 12a and pivots between a closed position, as illustrated in FIG. 1, to an open position whereby a recording medium, such as a CD, may be inserted or removed. A latch release button 16 may be actuated to release the lid 14 from the closed position to the open position. A window 18 in the lid 14 allows the user to view the CD inside the device 10. Also received in the upper portion 12a is a display window 20 with a plurality of openings for receiving interface buttons such as a Play/Pause button 22, Stop button 24, Next button 26, and Previous button 28. Functions associated with these buttons are described in subsequent paragraphs. The display window also includes a transparent portion for viewing a video display (described below) located adjacent the window 20.

Figure 2:
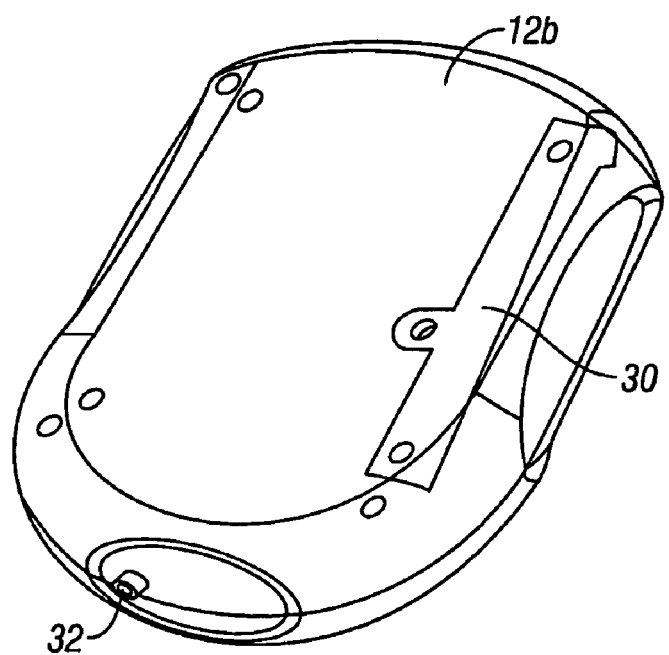
FIG. 2 illustrates an exemplary perspective view of the back of the portable device.

FIG. 2 illustrates an exemplary bottom view of the lower portion 12b of the portable device 10 according to one embodiment of the invention. One or more apertures or protrusions may be included in portions of the housing 12 to allow securement by one of many types of fasteners. In some constructions and in some aspects, the lower portion 12b includes a battery cover 30 coupled to the lower portion 12b and operable to retain batteries in the housing 12. One of ordinary skill will understand that the battery cover 30 may couple to the lower portion 12b in a variety of ways and using a plurality of types of fasteners. An audio jack 32 is also provided for electrical connection of external speakers, such as headphones. One should note that the location of the audio jack 32 is not restricted to the illustrated location.

Figure 3A:
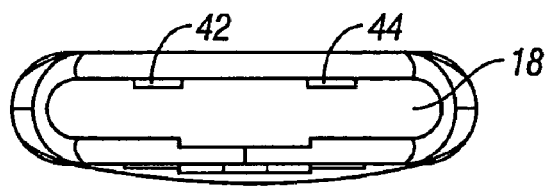
FIG. 3A illustrates an exemplary top view of the portable device.
Figure 3B:
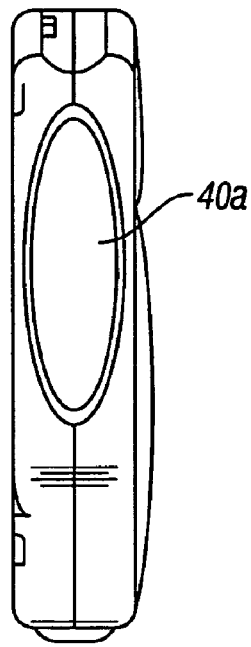
FIG. 3B illustrates an exemplary left side view of the portable device.
Figure 3C:
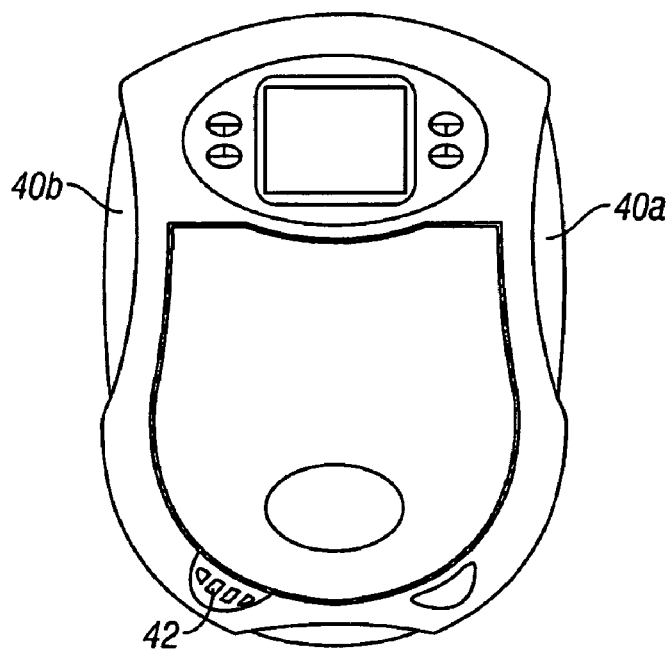
FIG. 3C illustrates an exemplary front view of the portable device.
Figure 3D:
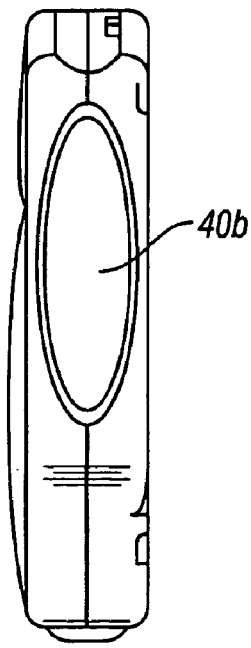
FIG. 3D illustrates an exemplary right side view of the portable device.

FIGS. 3A-3D provide additional views of the device 10. More specifically, FIG. 3A illustrates a top view of the device 10 including a volume control 36 and a contrast control 38. The volume control 36 may be implemented with a plurality of components including, but not limited to, a spur gear, rotary dial, up and down contact buttons, or the like. The same is true for the contrast control 38. The volume control 36 allows a user to change the amplitude of an audio signal sent to an internal speaker (described below) and the audio jack 32. The contrast control 38 allows a user to augment video signal parameters to effect a viewing preference. FIG. 3B and 3D illustrate an exemplary side view for one embodiment of the invention. As noted above, the device 10 may be contoured for comfort and ease of handling. Side pieces 40a and 40b may be formed integrally with the upper portion 12a and lower portion 12b, or be secured to the housing as separate components. In addition, the side pieces 40a and 40b may be constructed using a variety of materials. FIG. 3C illustrates an exemplary front view of the device 10 including a number of slots 42 formed in the upper portion 12a. In some embodiments, the slots 42 allow an audible audio signal to exit the device 10 and may also serve to aid in dissipating heat from within the device 10. It should be noted that other perforations or slots may be formed elsewhere in the housing 12 such that heat and/or sound may be propagated out of the device 10. In addition, a depression 41 is located over the slots 42 and extends under the lid 14. The depression 41 is provided to permit a user to use one or more fingers to aid in the removal of the disk.

Figure 4:
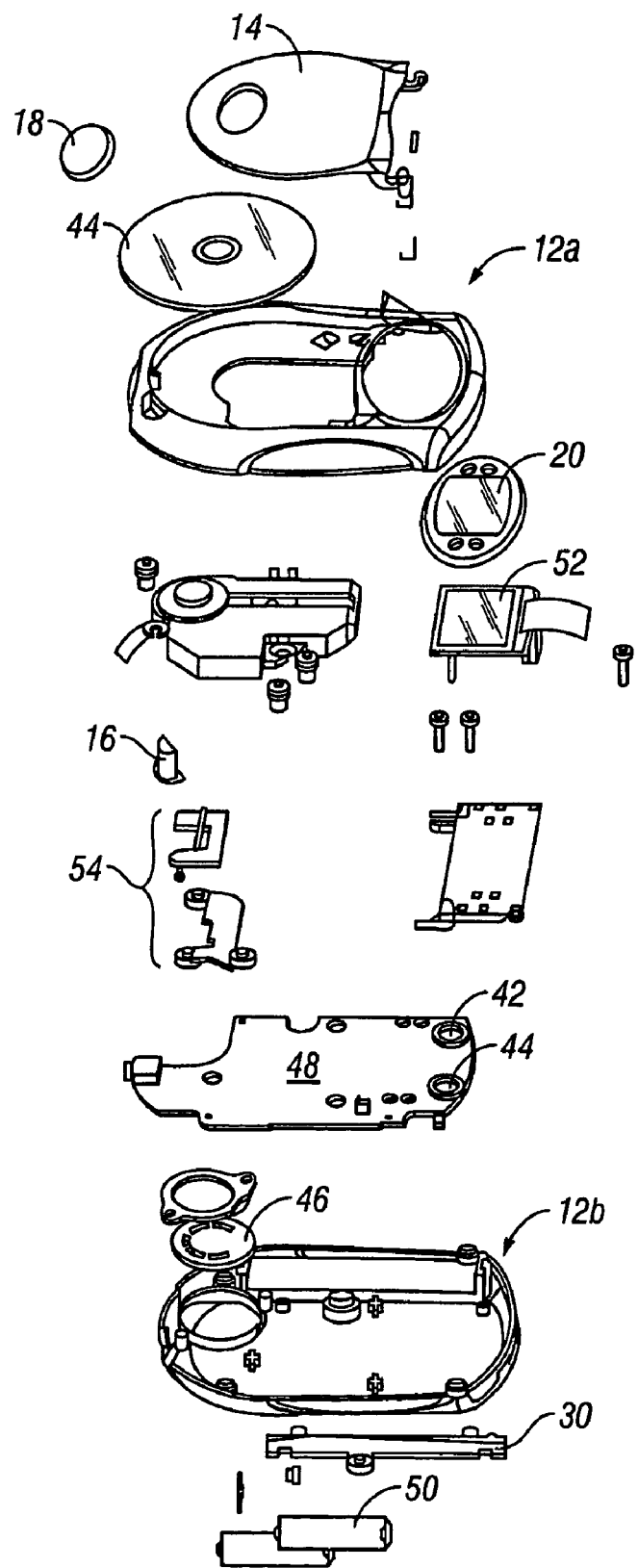
FIG. 4 illustrates an exemplary exploded view of the portable device.

FIG. 4 illustrates an exploded view of the portable device 10 including exemplary components located within the cavity formed by the upper portion 12a and lower portion 12b. More specifically and in addition to the above described components, FIG. 4 illustrates a light emitting diode data acquisition sub assembly or reader 45. Reader 45 mounts within the housing 12 so that a spindle or shaft of the reader 45 is exposed to the inserted CD 44. Reader 45 is operable to rotate the CD 44 in clockwise and counterclockwise directions and acquire the information stored thereon. The lower portion 12b may be configured so that additional components may be secured thereto, including a speaker 46, a circuit board 48, one or more batteries 50, and others. The circuit board 48 may include one or more electrical components, such as analog and digital components and is coupled to the reader 45, the volume control 42, the contrast control 44, the interface buttons, and others. In addition, a display unit 52 is operable to display video information and mounts adjacent the display window 20. The display unit 52 may be coupled to the circuit board 48. Alternatively, the device 10 may be configured to display video information on a remote host including a television or a gaming device such as a SEGA™ or GAMEBOY™. The upper portion 12a may include an aperture for receiving the display window 20. The display window 20 includes a transparent or semi transparent area that is operable to permit a user to view the video information being displayed by the display unit 52. A plurality of apertures may be included in the display window 20 for receiving interface buttons associated with the functions of the device 10. It should be noted that the device 10 is not limited to the disclosed interface buttons and that other or additional buttons may be included in embodiments of the invention. The latch release button 16 is received in the upper portion 12a of the housing 12 and is coupled to a release mechanism 54. The release mechanism 54 is operable to releasably secure the lid 14 in the closed position. As noted above, to remove the CD 44 from the device 10, the user may depress the latch release button 16, thereby actuating the release mechanism 54, to allow the lid 14 to pivot about a pivot axis to the open position. It should be noted that the configuration of the lid 14 is not limited to pivotal movement about an axis transverse to an axis of spindle rotation. Moreover, the lid 14 may also be configured to pivot about an axis parallel to an axis of spindle rotation. The illustration in FIG. 4 may include additional support and fastening devices to support and/or secure components associated with the device 10 that are not described but are known within the art.

Figure 5:
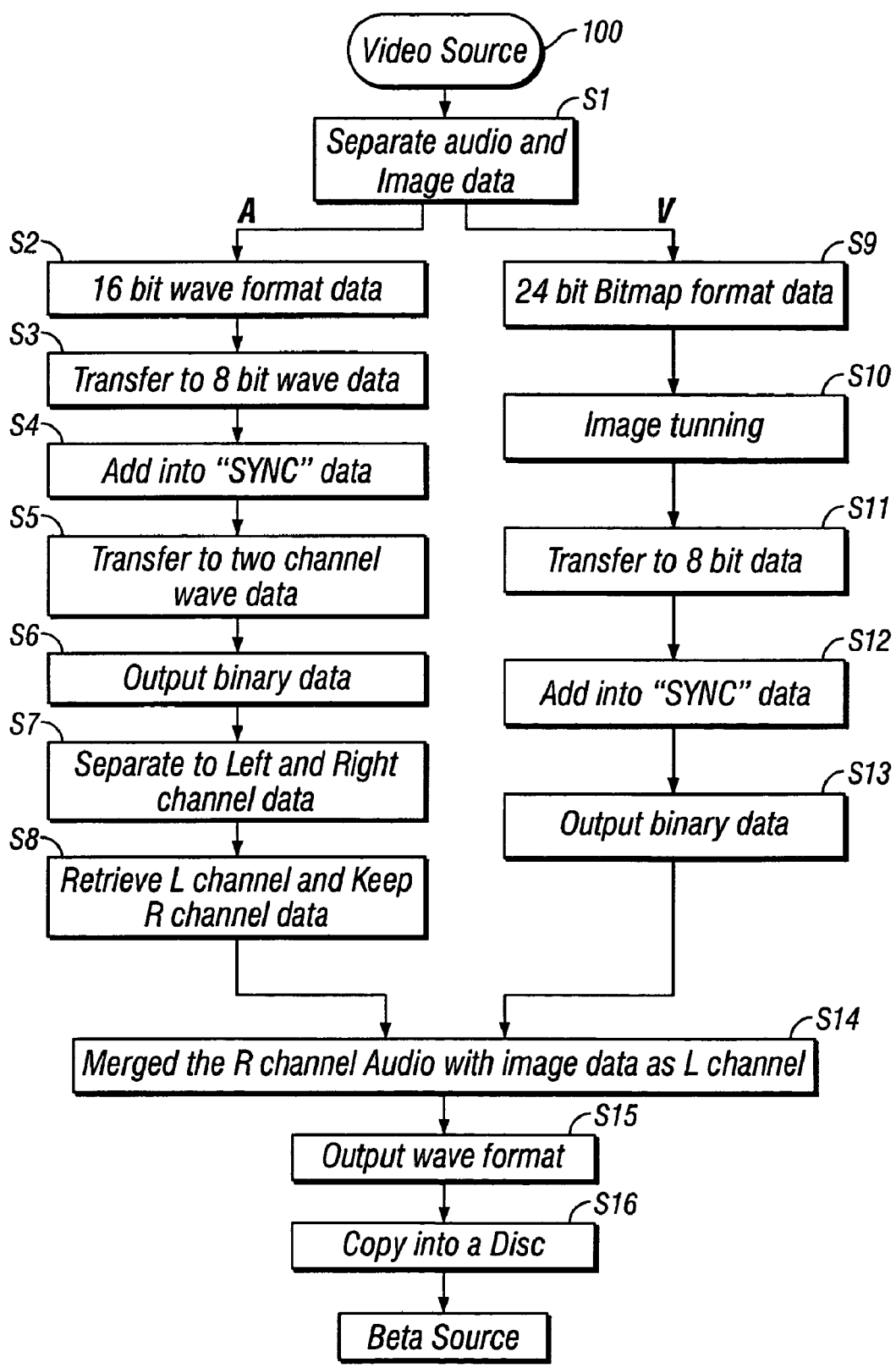
FIG. 5 illustrates an exemplary flow chart according to one embodiment of the invention.

Embodiments of the invention include a medium, such as a CD, that is formatted with audio and video information. In at least one embodiment, the format includes bitmap video information and mono audio information interlaced and recorded as a standard stereo audio track. As one example, the audio and video information is recorded as a standard 44.1 kHz 16-bit stereo signal and includes frame markers to allow for video frame recovery. More specifically, FIG. 5 illustrates a flowchart of exemplary steps performed to format audio and video information for use with the device 10. It should be noted that the steps illustrated in FIG. 5 are only intended to further the readers understanding of the way audio and video data is formatted and should not be considered as limiting.

With respect to FIG. 5, the exemplary process may begin with a video source 100. The video source 100 may include one of several different types of sources of video including analog and digital video sources. The process continues at a step SI where the audio and image data are separated. The audio data is formatted (step S2) as a 16-bit wave file formatted data. It should be noted that other configurations of the audio data may be used with the invention including 32-bit wave data or others. At a step S3, the audio data is converted to 8-bit wave data. At a step S4, the audio data or information is added to the synchronized data. At a step S5, the audio data may be transferred into two channel wave data. At a step S6, the audio data is converted to binary information and at a step S7, the audio information is separated into left and right channel binary data. At a step S8, the left channel information is retrieved, as well as the right channel information, and the right channel information is kept for subsequent processing. It should be noted that the left channel data may be kept instead.

With respect to the video information, steps S9-S13 may be implemented to process the video information and may occur simultaneously or in sequence with the audio information processing. Specifically, at a step S9, the video information is formatted as 24-bit bitmap data. In other embodiments, alternative data formats may be utilized including 16-bit bitmap data, 32-bit bitmap data, or others. At a step S10 the video information may be augmented to provide or include corrective measures with regard to image quality and characteristics such as contrast and gray scale. For example, a gamma correction table may be included to augment gray scale parameters associated with the image data. At a step S11, the video data is converted to 8-bit bitmap data. At a step S12, the video information or data is added to the synchronized data. At a step S13, the binary video data is prepared for output. At a step S14, the right channel audio data and video data are merged to stereo track associated with CD-DA. In one embodiment, the audio data is placed, or associated with, the right channel of the compact disc and the video data is associated with the left channel of the compact disc. Having merged the audio and video information, the process continues at a step S15 with a conversion of the right and left channel data to a wave file format. The formatted wave file may then be copied to a CD-DA. It should be noted that other mediums may be used for recordation of the audio and video information including magnetic tape, semiconductor-based memory, or others.

Figure 6:
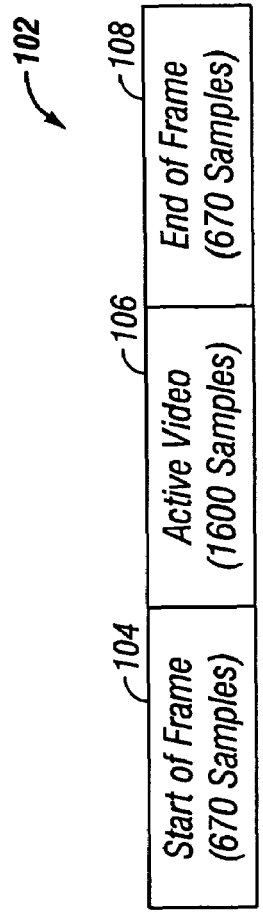
FIG. 6 illustrates an exemplary format of a video frame according to one embodiment of the invention.

FIG. 6 illustrates an exemplary format of a video frame 102 that includes frame markers and a video portion divided into a start-of-frame ("SOF") section 104, an active video portion 106, and end-of-frame ("EOF") section 108. In the example shown in FIG. 5, one sample equals 16 bits when the sampling rate is 44.1 kHz and each video frame contains 80×80=6400 pixels. In one embodiment, the frame rate is 15 frames/sec and the time for one video frame is 0.067 sec. Accordingly, the audio throughput for one channel during one video frame is 2940 samples. The throughput of one channel during one video frame is 2940 samples and the number of pixels of one video frame is 6400. Because one sample is 16 bits and one pixel is 4 bits, combining four pixels into one sample results in 1600 samples for one video frame. In one embodiment, there are 2940 available samples for one video frame and only 2464 samples are used to represent the real video samples. As shown in FIG. 5, of the 1340 unused samples, 670 unused samples may be implemented as the SOF section 104 and 670 unused samples may be implemented as the EOF section 108.

Figure 6A:
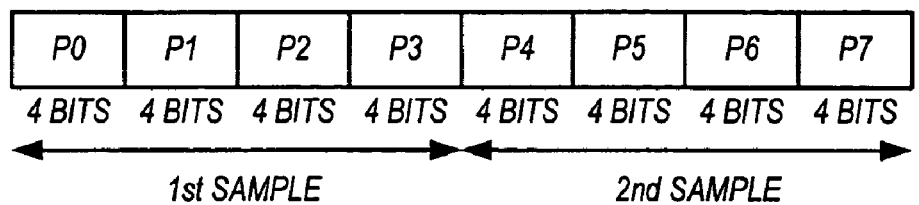
FIG. 6A illustrates an exemplary format of a video data according to one embodiment of the invention.

In one embodiment, there may be three formats of the SOF section 104 and the EOF section 108. The format may depend on whether the video frame is the first, the last, or in the middle of the video stream. As one example, when the video frame is the first frame of the selected video stream, the content of the SOF is E1E1E1 . . . with E1 repeated 1340 times and the content of the EOF is D2D2D2 . . . with D2 repeated 1340 times. When the video frame is the middle frame of the selected video stream, the content of the SOF is C3C3C3 . . . with C3 repeated 1340 times and the content of the EOF is B4B4B4 . . . with B4 repeated 1340 times. When the video frame is the last frame of the selected video stream, the content of the SOF is A5A5A5 . . . with A5 repeated 1340 times and the content of the EOF is 969696 . . . with 96 repeated 1340 times. FIG. 6A illustrates one exemplary format of the video frame for two video samples. The first sample includes P0 as the first pixel, P1 as the second pixel, P2 as the third pixel, and P3 as the fourth pixel. As illustrated, the second and subsequent samples may be of similar configuration. As discussed above, the video stream is put on the left channel of one sound track. As one example, if the duration of a video stream is 3 minutes, there will be 3*15*60=2700 frames and the number of samples of the left channel is 2700*2940*2=15876000 bytes.

Figure 6B:
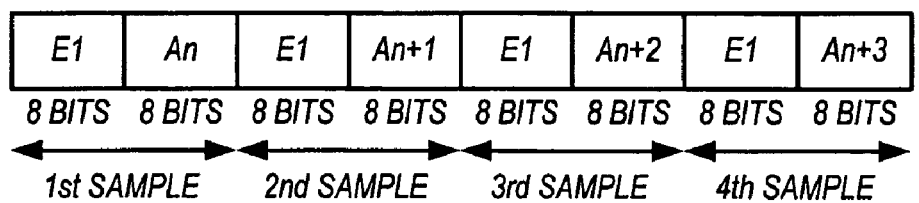
FIGS. 6B-6H illustrate exemplary audio data formats according to one embodiment of the invention.
Figure 6C:
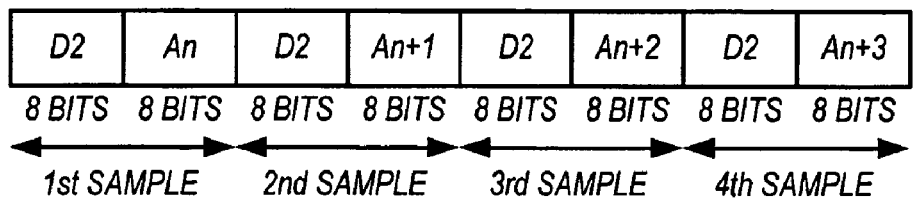
Figure 6D:
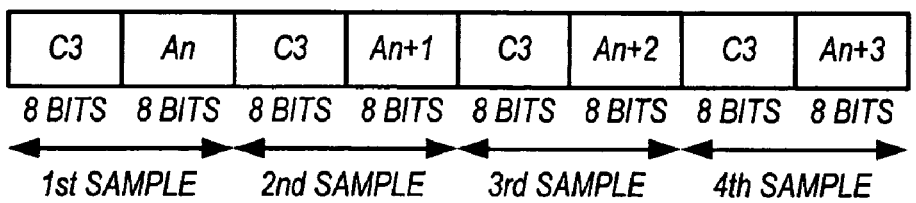
Figure 6E:
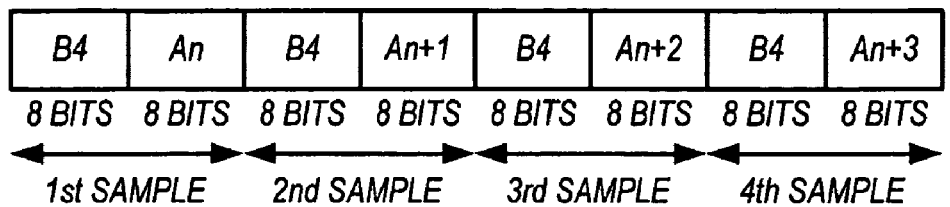
Figure 6F:
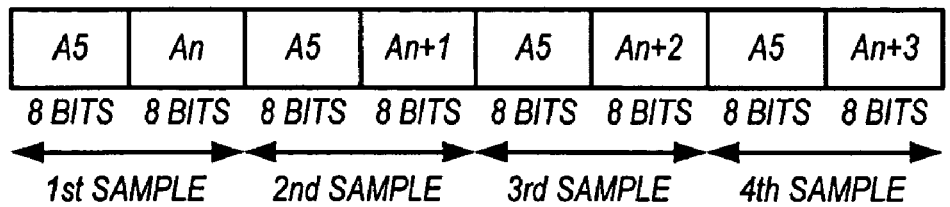
Figure 6G:
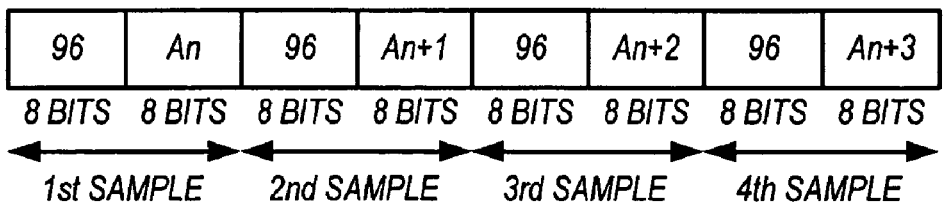
Figure 6H:
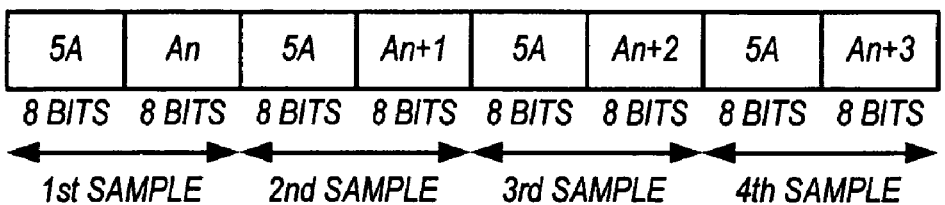

In one embodiment, the audio stream data format may be 44.1 kHz, 8-bit mono information placed on the right channel of one sound track. In addition, there may be multiple formats for the audio according to the content of the video data. Some exemplary formats are illustrated in FIGS. 6B-6H. For example, when the video frame is at the SOF section of the first frame of the selected video stream, the format of the audio may be as illustrated in FIG. 6B where E1 is the same as the SOF section of the video and An, An+1, An+2, An+3 . . . are the 8 bit audio samples. When the video frame is at the EOF section of the first frame of the selected video stream, the format of the audio may be as illustrated in FIG. 6C where D2 is the same as the EOF section of the video and A0,A1,A2,A3 . . . are the 8 bit audio samples. When the video frame is at the SOF section of the middle frame of the selected video stream, the format of the audio may be as illustrated in FIG. 6D where C3 is the same as the SOF section of the video and An, An+1, An+2, An+3 . . . are the 8 bit audio samples. When the video frame is at the EOF section of the middle frame of the selected video stream, the format of the audio may be as illustrated in FIG. 6E where B4 is the same as the EOF section of the video and An, An+1, An+2, An+3 . . . are the 8 bit audio samples. When the video frame is at the SOF section of the last frame of the selected video stream, the format of the audio may be as illustrated in FIG. 6F where A5 is the same as the SOF section of the video and An, An+1, An+2, An+3 . . . are the 8 bit audio samples. When the video frame is at the EOF section of the last frame of the selected video stream, the format of the audio may be as illustrated in FIG. 6G where 96 is the same as the EOF section of the video and An, An+1, An+2, An+3 . . . are the 8 bit audio samples. When the video frame is at the active region of the selected video stream, the format of the audio may be as illustrated in FIG. 6H where 5A is the ID of the video and An, An+1, An+2, An+3 . . . are the 8 bit audio samples. It should be noted the FIGS. 6A-6H are exemplary and that additional or alternative formats for the audio and/or video may be implemented.

Figure 7:
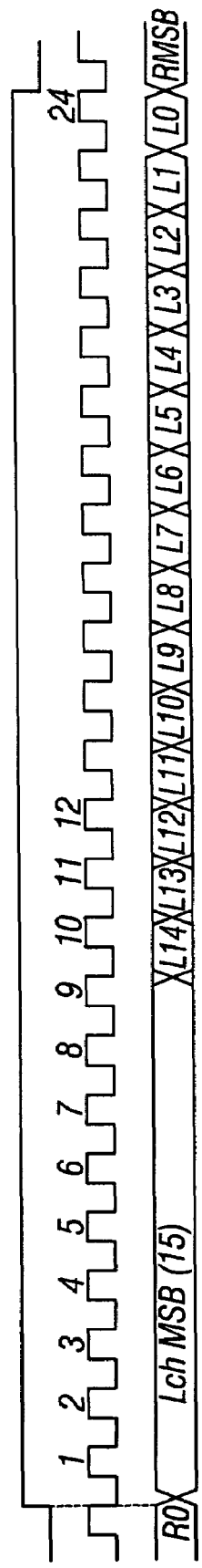
FIG. 7 illustrates an exemplary data format according to one embodiment of the invention.
Figure 6I:
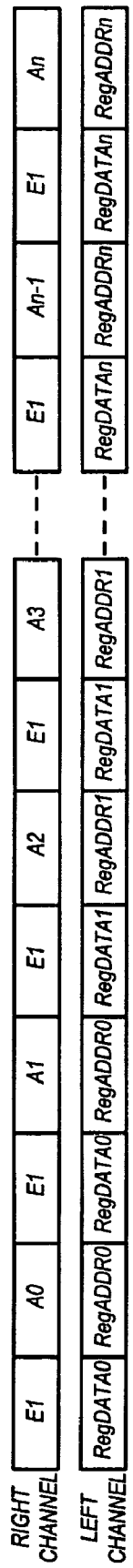
FIG. 6I illustrates an exemplary gamma table and register format according to one embodiment of the invention.

Furthermore, the above-discussed gamma table and the internal registers may be programmed from the CD-DA disc. This information can be located at the SOF section of the left channel where the SOF section is "E1." As illustrated in FIG. 6I, the sequence for the information may include address and data information that is repeated twice to reduce the chance of error. As shown, the RegAddrX at the left channel is be mapped to the Ax (8-bit audio sample) and the RegDataX at the left channel is mapped to the "E1." FIG. 7 illustrates an exemplary serial output data format for 16 bit data that may be associated with a video interface 104 (FIG. 8).

Figure 8:
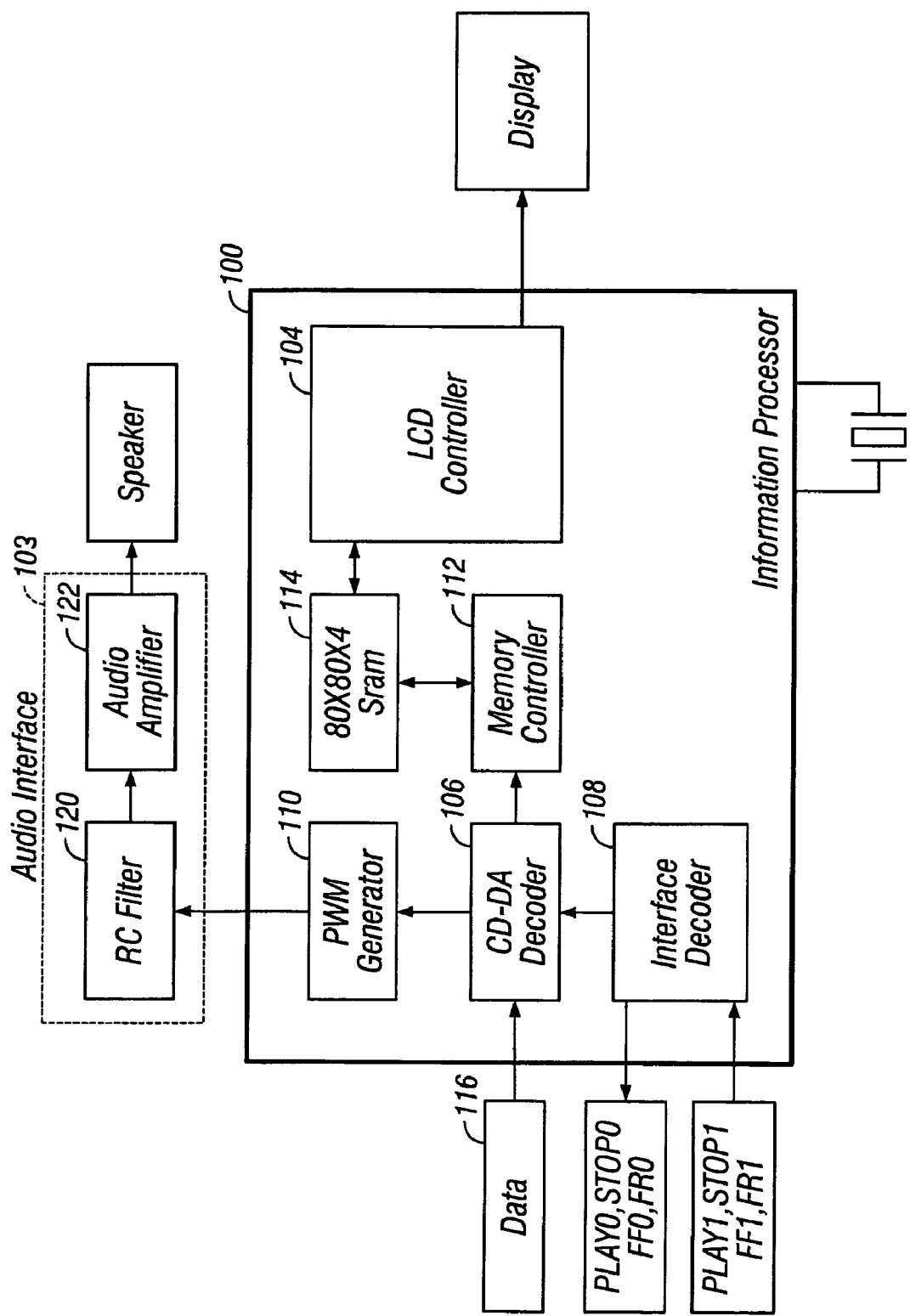
FIG. 8 illustrates components associated with an information processor according to one embodiment of the invention.

As illustrated in FIG. 8, one embodiment of the invention includes an information processor 100 that is coupled to the reader 45, an audio interface 103, and a video interface 104. The information processor may also include a data decoder 106, an interface decoder 108, a pulse width modulation ("PWM") generator 110, a memory controller 112, and a data storage device or memory 114. In one embodiment, data 116 extracted information from the recordable medium by the reader 45 includes interlaced audio and video information as described above. Preprocessing such as filtering, amplification, and digital-to-analog conversion may be applied to the information before it is received by the data decoder 106. The data decoder 106 accepts the information from, for example, a 16-bit digital-to-analog converter and decodes the video information into a 4-bit 80×80-pixel resolution. The audio information may be decoded having 8-bit monaural resolution.

In some embodiments, the interface buttons may include the Play/Pause button 22, Stop button 24, Next button 26, and Previous button 28. The interface decoder 108 is coupled to the reader 45 and the interface buttons for decoding user input and controlling the operation of the reader 45. The Play/Pause button 22 is operable to cause the reader 45 to play or pause the reproduction of audio and video information. The Stop button 24 is operable to cause the reader 45 to stop operation. The Next button 26 and Previous button 28 are operable to cause the reader 45 to fast-forward, or skip, to the next stored content and fast-reverse to the previously stored content, respectively. In addition, these inputs may be similar to the "Preview," "Pause," and "Jump" inputs illustrated in FIG. 9A.

In some embodiments, the audio information is sampled as an 44.1 kHz, 8-bit, monaural signal. The PWM generator 110 is operable to convert the 8-bit audio information into a PWM signal. This PWM signal may then be output to the audio interface 103. In the exemplary illustration, the audio interface 102 includes a filter 120 and an amplifier 122, although may include more or fewer components including transistors. The audio interface 103 is operable to receive the audio information, or signal, from the information processor 100 and provide additional filtering and signal amplification. In another embodiment, the audio interface is optional and the audio signal is output to the speaker directly from the PWM generator 110. In one embodiment, the volume control 36 is coupled to the audio interface 102 and operable to cause a variance in the amount of signal amplification. The signal output from the audio interface 102 may be received by either or both the speaker 46 and another device, such as headphones, coupled to the audio jack 32.

The memory controller 112 is coupled to the decoder 106 and accepts the decoded video information. The memory controller 112 routes the information to the memory 114 at a rate corresponding to a desired frame rate. The memory 114 is illustrated as being 32-bit random access memory ("RAM"), however, other types of volatile and non-volatile memory may be implemented for use with the device 10. The memory 114 receives the video information, or signal, and stores the information for output to the video interface 104. The video interface 104 accesses the information stored in the memory 114 and outputs the data to the display unit 52. The display unit may include a liquid crystal display ("LCD") device operable to display video information, such as, but not limited to, 80×80-pixel information with a 16 gray scale format and at 15 frames/second. In one embodiment, a 16 gray scale format is displayed using a frame rate modulation technique. In addition, there may be 32 available gray scales and the gamma table is programmed to select 16 of those 32. The gamma table may be programmed either by a serial bus connection or by the data decoder 106 that decodes the table stored on, for example, the CD-DA.

Figure 9A:
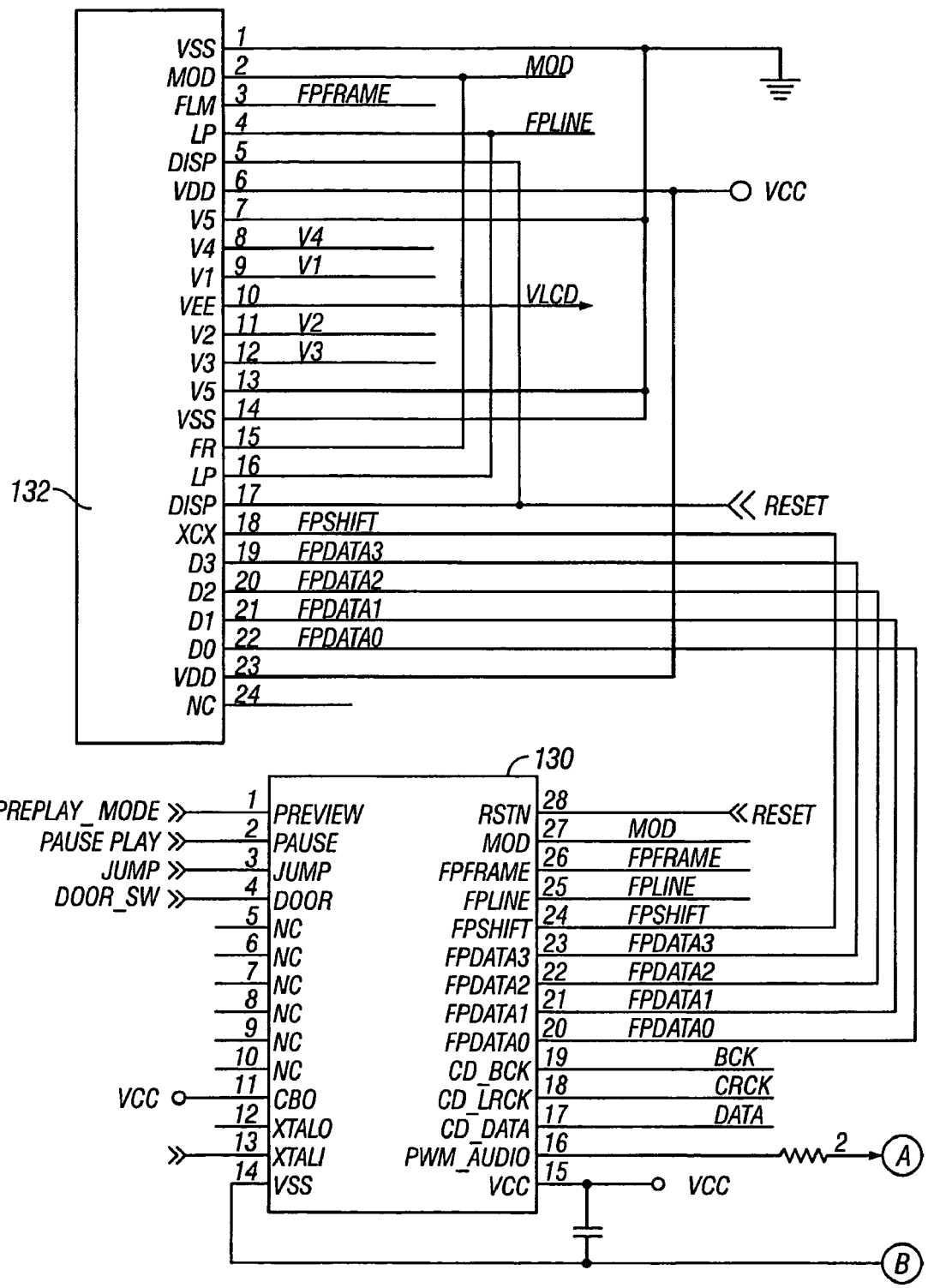
FIGS. 9A and 9B illustrate one exemplary configuration of the information processor.
Figure 9B:
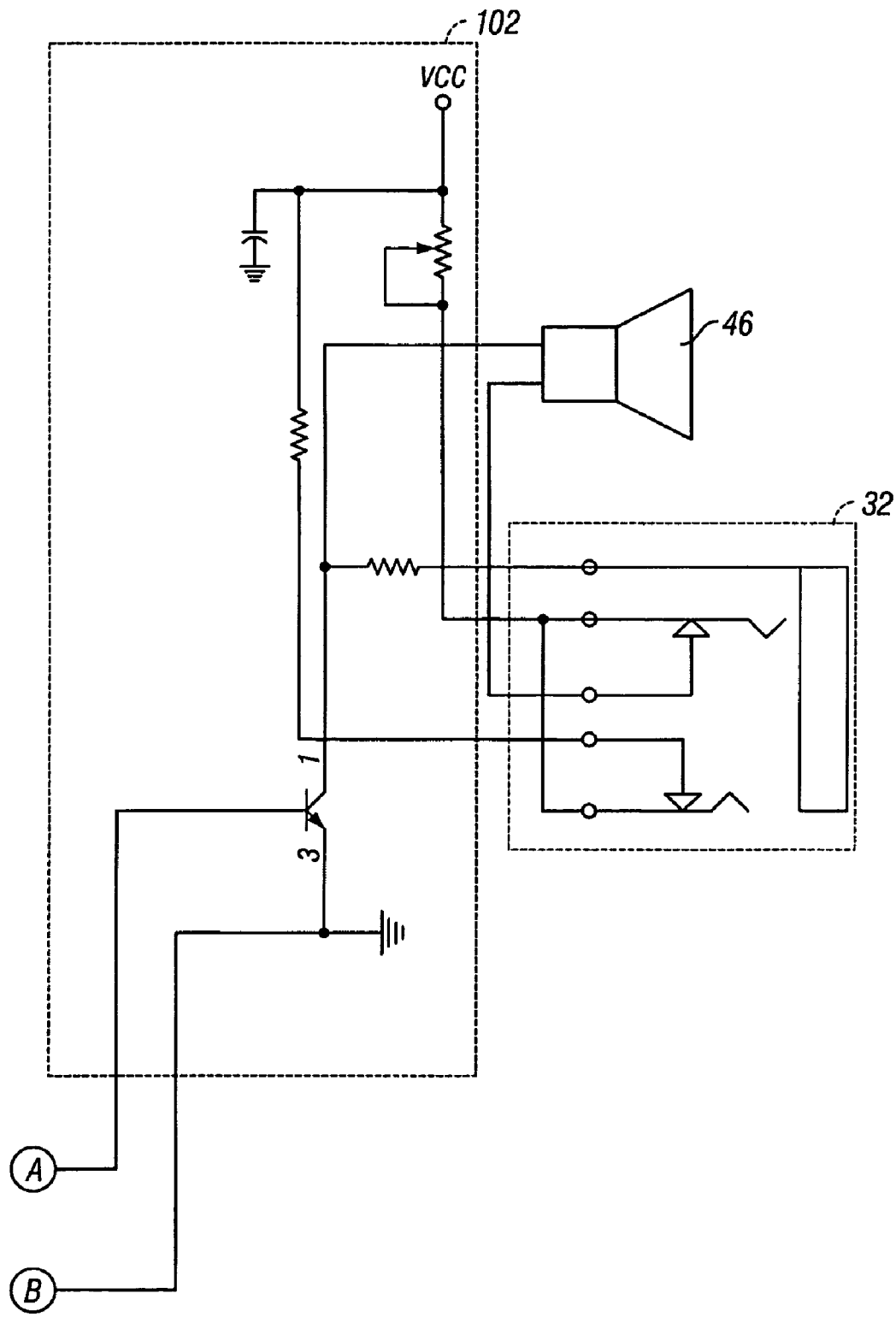

FIGS. 9A and 9B illustrate one exemplary configuration of the information processor 100, the audio interface 102, the video interface 104, and additional components. More specifically, FIG. 9A illustrates semiconductor devices 130 and 132 configured to implement a portion of the information processor 100 and video interface 104, respectively. FIG. 9B illustrates an exemplary circuit configuration for the audio interface 102 and also includes an exemplary speaker 46 and audio jack 32.

Figure 10:
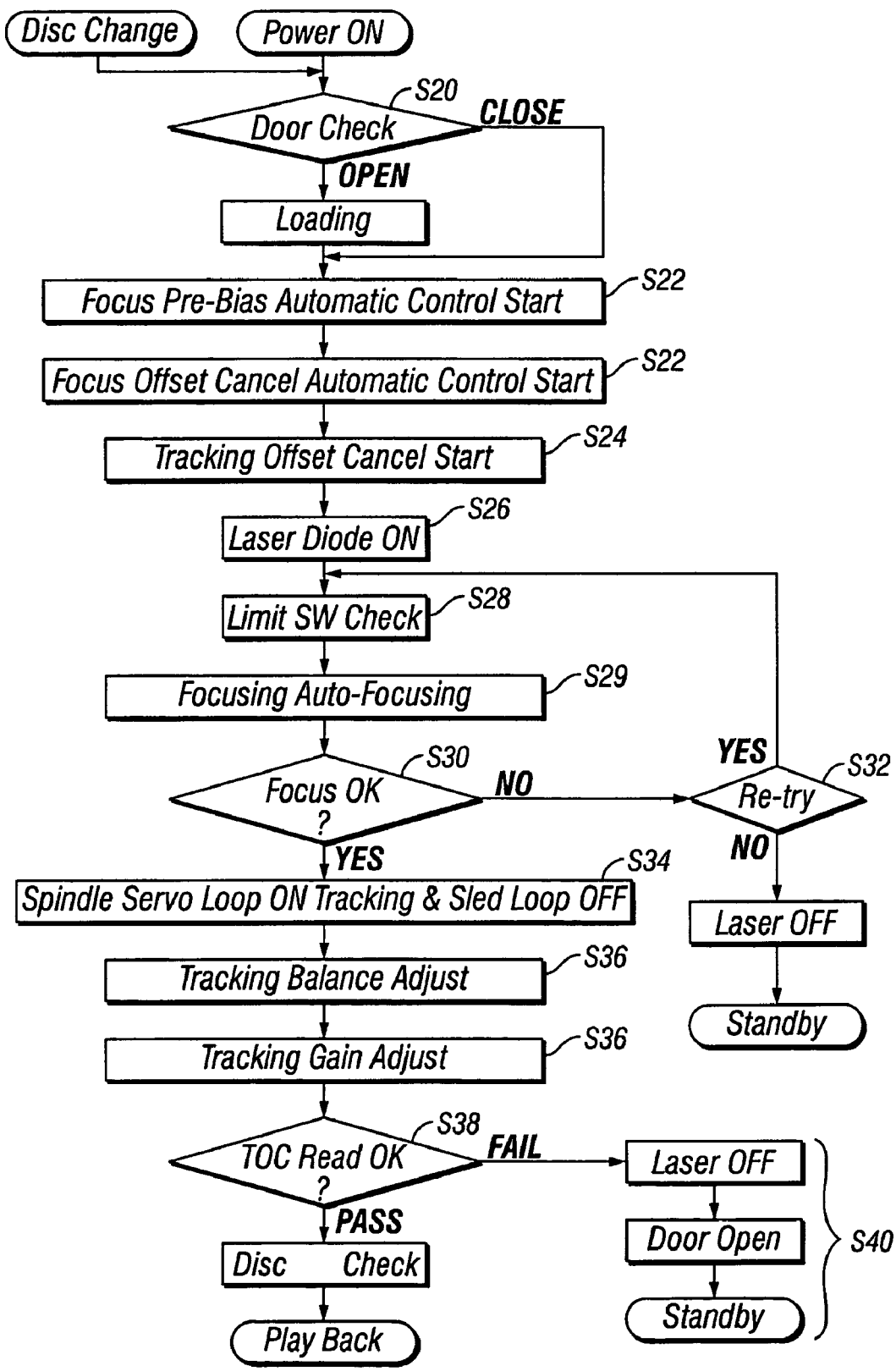
FIG. 10 illustrates steps associated with a start up procedure according to one embodiment of the invention.

FIG. 10 illustrates steps for an exemplary start up procedure that may include one or more steps to check for a properly inserted media. The exemplary procedure may also include security checks to determine if the inserted media is compatible with the device 10. More specifically, the device 10 may be loaded with a CD-DA and a door check (step S20) may be performed to determine the loading status of the media. The door check may include querying one or more sensors (not shown) coupled to the latch release mechanism 54 (FIG. 4). Control start sequences (step S22) are carried out to set the focus configuration for the pre-bias and offset characteristics of the reader 45. The tracking offset may be adjusted (step S24) and a laser diode associated with reader 45 is turned on (step S26). A limit switch check (step S28) and a focusing check (step S29) are performed and if the focus check fails, a decision is made (step S32) to either repeat the limit switch and focus checks or shut the laser off and place the device 10 in a stand-by mode. If the focus is okay, the spindle servo associated with the reader 45 is turned on (step S34) and the tracking and sled loop is turned off. Tracking balance and gain adjustments are made (step S36) and an attempt to read the table of contents ("TOC") is made (step S38). If the table of contents read fails the laser will be turned off, the lid 14 opened, and the portable device 10 placed on stand-by (step S40). If the table of contents is successfully read, a security check is performed to determine if the disc is compatible with the device 10. In one embodiment, this security check is based on the physical size of the CD-DA. For example, the CD-DA used with the invention may be an 85 mm diameter disc. When the lid 14 is first closed, the firmware will instruct the reader 45 to move the laser to an outer edge of what should be an 85 mm disc. The firmware will also instruct the reader 62 to extract a security track from this outer region of the disc. A disc media having a size of 80 millimeters will not contain information at this outer edge location and therefore be rejected. A 120 mm disc will not physically fit into a media receiving cavity formed in the upper portion 12a of the housing 12. Additional security checks may include instructing the reader 45 to start from the inner or outer most track and move to the outer or inner most track, respectively. The diameter of the disc is then calculated based on how far the laser traveled. If the diameter is determined to be unacceptable, the device 10 will not play the disc. Further, the format of the audio and video information is such that a standard CD-DA player is not able to decode the interlaced audio and video and, therefore, is not able to accurately reproduce the recorded information.

Other security features may include storing the gamma correction tables may be at an outer track instead of near or within the TOC and storing the gamma correction table for the CD in the SOF section of the left channel so that a different table can be used for each title on the CD. Also, the TOC may be read to determine if the content for the CD is more than 30 minutes. Accordingly, there may be a dummy track included at the end of the CD that is ignored by navigation and is not played, but can be used to pad the CD to be more than 30 minutes.

Figure 11A:
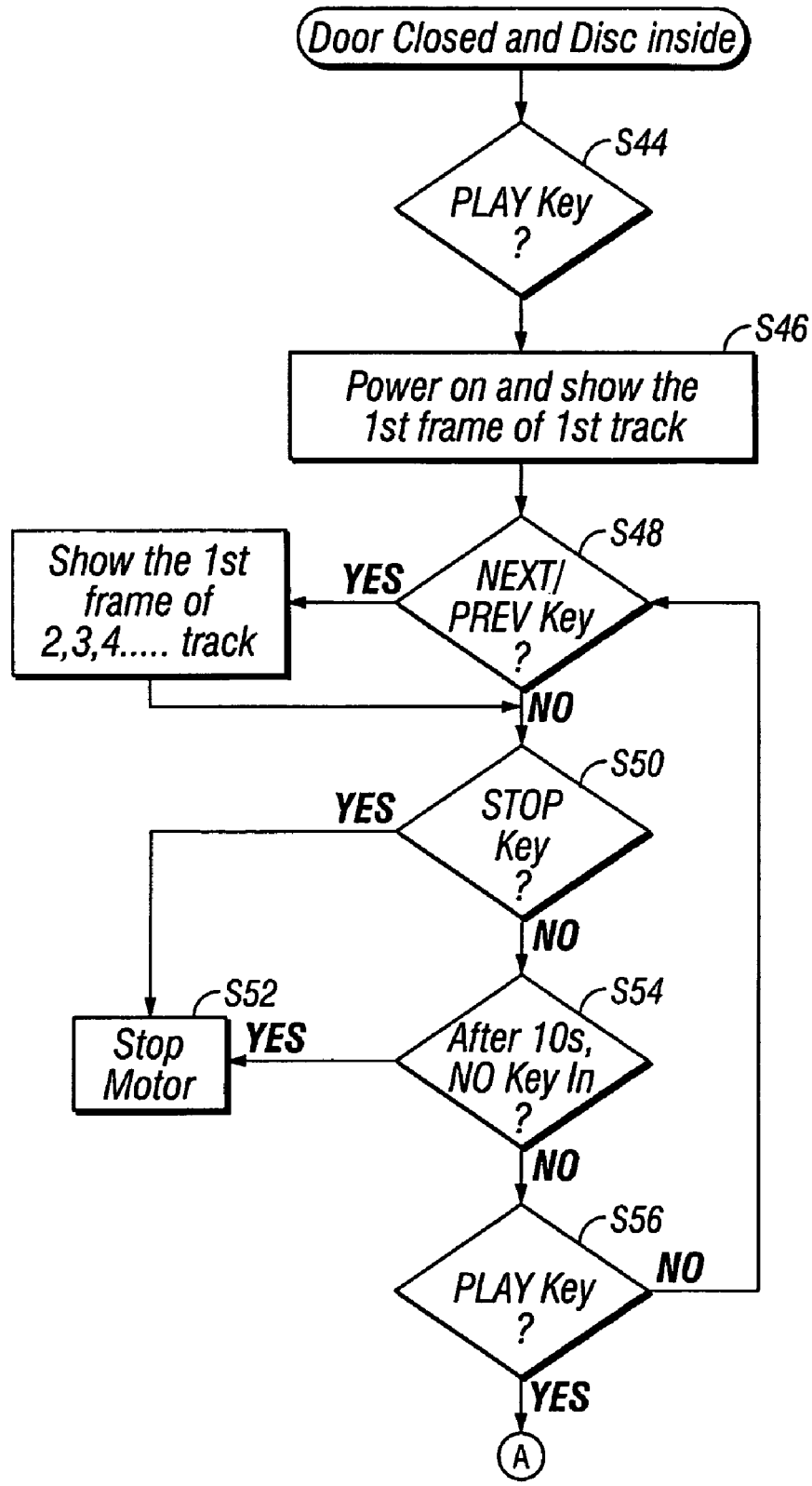
FIGS. 11A and 11B illustrate exemplary operational logic according to one embodiment of the invention.
Figure 11B:
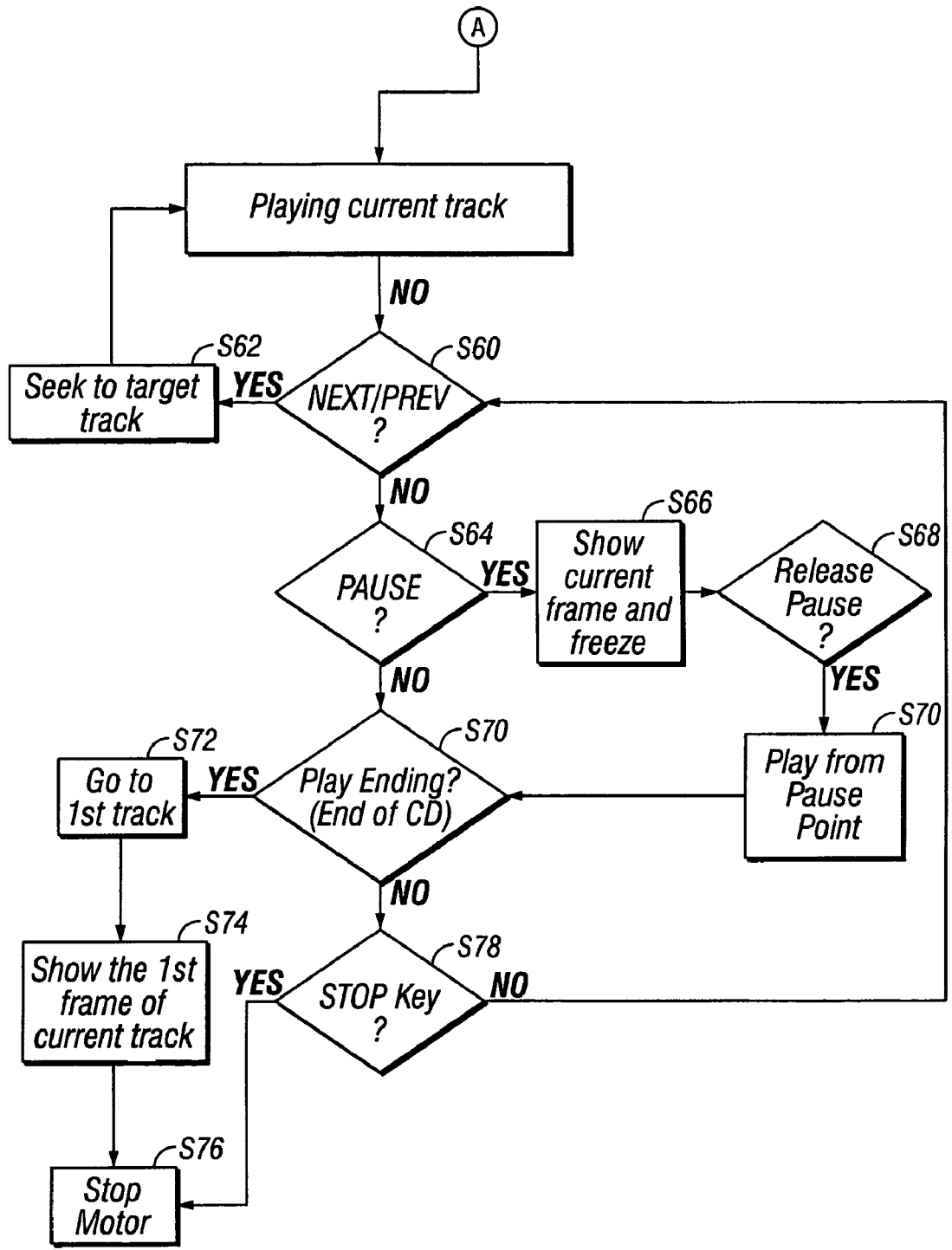

FIGS. 11A and 11B respectively illustrate a flowchart of exemplary operation logic associated with a pre-view mode and a play mode of the device 10. More specifically, FIG. 11A includes steps for device 10 operation once a properly authorized disc is loaded and the lid 14 is closed. The device 10 may be configured to automatically begin playing the first track recorded on the CD-DA or may remain in a stand-by mode until the Play/Pause button 22 is pressed (step S44). Once pressed, the power is turned on and the first frame of the first track is reproduced (step S46). If the Next button 26 or the Previous button 28 is pressed (step S48), the information processor 100 is operable to cause the reader 45 to move to the first frame of the next or previous track. If the Stop button 24 is pressed (step S50), the spindle motor associated with the reader 45 is instructed to stop (step S52). If the Stop button 24 is not pressed, the information processor 100 waits for a period of time before automatically stopping the spindle motor of the reader 45. If the Play/Pause button 22 is pressed within the set period of time, the device begins playing the currently selected track. FIG. 1 B illustrates further operational steps associated with a play mode of the device 10. More specifically, while a track is being reproduced, or played, the Next button 26 or the Previous button 28 may be pressed (step S60). The act may cause the information processor 100 to instruct the reader 45 to seek to the desired track. The seek operation (step S62) may include both a fast forward/reverse operation whereby the user may search for a location within the current track, and a skip forward/reverse operation where the next or previous track is displayed from the beginning. If the Play/Pause button 22 is pressed during playback, the current frame is displayed in a still fashion (step S66) until the Play/Pause button 22 is pressed again (step S68), at which time the track resumes playback (step S70) from the current location. Without pressing additional buttons, the device 10 is operable to playback the information stored on the CD-DA in its entirety. When the information processor receives indication that the end of the last track has been read, the reader 45 may be instructed to return (step S72) to the beginning of the first track, show the first frame of the current track (step S74), and stop the spindle motor (step S76). If the ending of the CD-DA is not being played and the Stop button 24 is pressed (step S74), the first frame of the current track is shown (step S74), and spindle motor is stopped (step S76). If the Stop button 24 is not pressed, the information processor 100 continues to reproduce the recorded information.

What is claimed is:

1. A method of formatting audio and video information on a compact disc and reproducing the audio and video information using a portable device having an information processor coupled to an audio interface, a video interface, and a light emitting diode data acquisition sub-assembly for reading information from the compact disc, the video information having a video frame rate and the audio information having a sampled audio throughput for a single frame of video, the method comprising:

combining a number of video pixels per sample, thereby generating a reduced sample-per-frame number;

allocating a portion of available samples, determined from a comparison between the sampled audio throughput and the reduced sample-per-frame number, as a frame start portion and a frame end portion;

formatting the frame staff portion and the frame end portion;

recording the video information as non-compressed video on a first channel and the audio information on a second channel, the video and audio information being recorded as a modulated signal;

acquiring the video and audio information by the light emitting diode data acquisition sub-assembly;

processing the video and audio information in the information processor such that video information is provided to the video interface and audio information is provided to the audio interface; and reproducing the video and audio information;

wherein the first and second channels are respective left and right audio channels associated with the compact disc, and the video and audio information are time-synchronized.

2. The method of claim 1, wherein acquiring the video and audio information includes clockwise rotation of the compact disc by the light emitting diode data acquisition sub-assembly.

3. The method of claim 1, wherein acquiring the video and audio information includes counterclockwise rotation of the compact disc by the light emitting diode data acquisition sub-assembly.

4. The method of claim 1, further comprising a security check to determine if the compact disc is of proper size.

5. The method of claim 1, further comprising a security check to determine if the compact disc is properly formatted.

6. The method of claim 1, wherein the compact disc is a compact disc digital audio and the modulated signal comprises audio data stored thereon.

7. The method of claim 1, wherein the compact disc is approximately 85 mm in diameter.

8. The method of claim 1, wherein each of the video and audio information being recorded as modulated signals respectively comprise compact disc digital audio (CD-DA) modulated signals, each formatted from one of the stereo channels of the CD-DA with the bit map video information being stored on one audio channel and the audio information being stored on the other stereo channel with the first and second channels being time-synchronized.

9. The method of claim 1, wherein each of the video and audio information being recorded as modulated signals respectively comprise compact disc digital audio (CD-DA) modulated signals, each formatted from one of the stereo channels of the CD-DA with the bit map video information being stored on one audio channel and the audio information being stored as pulse code modulated (PCM) mono audio information interlaced on the other stereo channel with the first and second channels being time-synchronized.

10. A system for reproducing audio and video information, the system comprising:

a recorder for associating non-compressed video and audio information with respective first and second channels formatted for recordation onto a compact disc;

a portable device for reproducing data stored on a compact disc, the device comprising:

a housing for receiving a compact disc;

a video interface for acquiring the non-compressed video information from a first channel of the compact disc, the non-compressed video information having a video frame rate, with video frames formatted at frame start and frame end portions;

an audio interface for acquiring audio information from a second channel of the compact disc, the video and audio information being recorded as a modulated signal, said audio information having a sampled audio throughput for a single frame of non-compressed video combined as a number of video pixels per sample in a reduced sample-per-frame number;

a light emitting diode data acquisition sub-assembly operable with the video interface and audio interface from the modulated signal information where the first and second channels each correspond to one of left and right audio channels associated with the compact disc for reading information from the compact disc;

an information processor coupled to the video interface, the audio interface, and the light emitting diode data acquisition sub-assembly reproducing the video and audio information from the modulated signal information from the left and right audio channels, the video and audio information being acquired according to the sampled audio throughput with the number of video pixels per sample according to the reduced sample-per-frame number; and a display unit in communication with the video interface for displaying video information generated by the information processor;

wherein the information processor receives interlaced and time-synchronized audio and non-compressed video signals from the data acquisition sub-assembly, the audio and video signals being derived from first and second channels on the compact disc, and the video signal having one or more frame markers to allow for video reproduction.

11. The system of claim 10, wherein the modulated signal is processed by the information processor into respective audio and video signals.

12. The system of claim 10, wherein the modulated signal comprises interleaved video and audio information.

13. The system of claim 10, wherein the compact disc is a compact disc digital audio and the modulated signal comprises audio data stored thereon.

14. The system of claim 10, wherein the display unit is in the housing and operable to display bit map information.

15. The system of claim 10, wherein the display unit is a liquid crystal display.

16. A system for reproducing audio and video information, the system comprising:

a recorder for associating non-compressed video and audio information with respective first and second channels formatted for recordation onto a compact disc;

a portable device operable to receive the compact disc and including:

a housing for receiving a compact disc and having:

an upper portion;

a lid coupled to the upper portion;

a lower portion;

wherein the lid is coupled to the upper portion at a pivot point such that the lid pivots between an open position and a closed position;

a video interface for acquiring non-compressed video information from a first channel of the compact disc, the non-compressed video information having a video frame rate, with video frames formatted at frame start and frame end portions;

an audio interface for acquiring audio information from a second channel of the compact disc, the video and audio information being recorded as a modulated signal, said audio information having a sampled audio throughput for a single frame of non-compressed video combined as a number of video pixels per sample in a reduced sample-per-frame number;

a light emitting diode data acquisition sub-assembly operable with the video interface and audio interface from the modulated signal information where the first and second channels each correspond to one of left and right audio channels associated with the compact disc for reading information from the compact disc;

an information processor coupled to the video interface, the audio interface, and the light emitting diode data acquisition sub-assembly reproducing the video and audio information from the modulated signal information from the left and right audio channels, the video and audio information being acquired according to the sampled audio throughput with the number of video pixels per sample according to the reduced sample-per-frame number; and a display unit in communication with the video interface for displaying video information provided from the information processor;

wherein the information processor receives interlaced and time-synchronized audio and video signals from the data acquisition sub-assembly, the audio and non-compressed video signals being derived from first and second channels on the compact disc, and the video signal having one or more frame markers to allow for video reproduction.

17. The system of claim 16, wherein the lid pivots about an axis that is parallel to an axis of compact disc rotation.

18. The system of claim 16, wherein the lid pivots about an axis that is perpendicular to an axis of compact disc rotation.

19. The system of claim 16, wherein the compact disc is approximately 85 mm in diameter.

20. The system of claim 16, wherein the display unit is a liquid crystal display.

21. A portable device for reproducing information stored on a compact disc, the device comprising:

a housing for receiving the compact disc;

a video interface for acquiring non-compressed bit map video information from a first channel of the compact disc, the video information having a video frame rate, with video frames formatted at frame start and frame end portions;

an audio interface for acquiring audio information from a second channel of the compact disc, the video and audio information being recorded as a modulated signal, said audio information having a sampled audio throughput for a single frame of the bit map video information combined as a number of video pixels per sample in a reduced sample-per-frame number;

a light emitting diode data acquisition sub-assembly operable with the video interface and audio interface from the modulated signal information where the first and second channels each correspond to one of left and right audio channels associated with the compact disc for reading information from the compact disc;

an information processor coupled to the video interface, the audio interface, and the light emitting diode data acquisition sub-assembly reproducing the video and audio information from the modulated signal information from the left and right audio channels, the video and audio information being acquired according to the sampled audio throughput with the number of video pixels per sample according to the reduced sample-per-frame number; and a display unit in communication with the video interface for displaying video information provided from the information processor;

wherein the information processor receives a time-synchronized modulated signal from the data acquisition sub-assembly providing an audio signal and a video signal derived into a first channel and a second channel from the compact disc, the video signal having one or more frame markers to allow for video reproduction from the modulated signal.

22. The device of claim 21, wherein the modulated signal is processed by the information processor into respective audio and video signals.

23. The device of claim 21, wherein the modulated signal comprises interleaved video and audio information.

24. The device of claim 21, wherein the compact disc is a compact disc digital audio and the modulated signal comprises audio data stored thereon.

25. The device of claim 21, wherein the light emitting diode data acquisition subassembly rotates the compact disc clockwise.

26. The device of claim 21, wherein the audio interface comprises an amplifier and a filter.

27. The device of claim 21, wherein the audio interface is coupled to a speaker in the housing.

28. The device of claim 21, wherein the display unit is in the housing and operable to display bit map information.

29. The device of claim 21, wherein the display unit is a liquid crystal display.

30. The device of claim 21, wherein the compact disc is approximately 85 mm in diameter.

31. The device of claim 21, further comprising:

a recorder for associating the non-compressed video and the audio information with respective first and second channels formatted for recordation onto the compact disc; and wherein the information processor of the portable device for reproducing information stored on the compact disc receives interlaced and time-synchronized audio and non-compressed video signals from the data acquisition sub-assembly, the audio and video signals being derived from first and second channels on the compact disc, and the video signal having one or more frame markers to allow for video reproduction.

32. The device of claim 21, wherein the video information and the audio information from the video interface and audio interface respectively comprise compact disc digital audio (CD-DA) modulated signals, each formatted from one of the stereo channels of the CD-DA with the bit map video information being stored on one audio channel and the audio information being stored on the other stereo channel with the first and second channels being time-synchronized.

33. The device of claim 21, wherein the video information and the audio information from the video interface and audio interface respectively comprise compact disc digital audio (CD-DA) modulated signals, each formatted from one of the stereo channels of the CD-DA with the bit map video information being stored on one audio channel and the audio information being stored as pulse code modulated (PCM) mono audio information interlaced on the other stereo channel with the first and second channels being time-synchronized.

* * * * *